No. 737,023. PATENTED AUG. 25, 1903.
F. C. ROCKWELL.
COMPOSITION FUEL.
APPLICATION FILED OCT. 22, 1902.
NO MODEL.
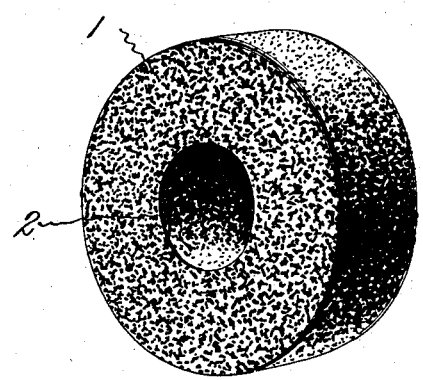
Witnesses
C. F. Kilgore
H. H. Williams
Inventor
Frederick C. Rockwell
Harry P. Williams
Attorney No. 737,023.

Patented August 25, 1903.

UNITED STATES PATENT OFFICE.

FREDERICK C. ROCKWELL, OF WEST HARTFORD, CONNECTICUT.

COMPOSITION FUEL.

SPECIFICATION forming part of Letters Patent No. 737,023, dated August 25, 1903.

Application filed October 22, 1902. Serial No. 128,286. (No specimens.)

*To all whom it may concern:*

Be it known that I, FREDERICK C. ROCKWELL, a citizen of the United States, residing at West Hartford, in the county of Hartford and State of Connecticut, have invented certain new and useful Improvements in Composition Fuel, of which the following is a specification.

This invention relates to a composition fuel which is manufactured of an inflammable vegetable body and metallic sulfates intimately united and formed into hard and compact pieces of suitable size.

The object of this invention is to provide a very simple, cheap, and convenient fuel which can be used economically in large or small quantities and which has such qualities that it will burn steadily and emit bright smokeless flames having beautiful colors.

The accompanying drawing illustrates one form in which the pieces of this fuel may be made.

It is preferred to make the body 1 of this fuel of peat or similar vegetable matter coked or carbonized. One manner of producing this body is to extract the superfluous moisture by pressure or otherwise from swamp or marsh peat and when dry by a suitable machine form and compact this peat into pieces of the desired shape and size. This shape is preferably either a lozenge or cylinder; but of course it may be globular, or it may be a lump of any other regular or irregular configuration. These pieces may be made in the sizes of the ordinary domestic fuel, and they preferably have indentations or recesses 2, as shown in the drawing. The pieces of dried and compressed peat may then be placed in a coking-kiln and carbonized in the usual manner. When coked and before they are cold, these pieces, which are of a hard granular nature and are porous and absorbent, may be immersed in a solution containing a metallic sulfate, such as a sulfate of copper, combined with which is a small quantity of chlorid of sodium. The pieces need not be immersed in such a solution. The depressions or recesses may be filled with the sulfate and chlorid. If desired, a small quantity of gas-tar may be mixed with the peat for coking purposes, and the sulfate of copper, with the chlorid of sodium, may be mixed into the body before it is pressed into shape and coked. These pieces of fuel formed in this manner of these substances are inflammable. They burn steadily and produce a bright hot fire, which emits blazes of beautiful variegated colors, depending upon the proportions of sulfate and chlorid in the composition. If sulfate of copper predominates, the flame will vary from green to dark blue. Fuel made in this manner will burn freely, yet slowly, and leave comparatively little ash, and as the sulfate and chlorid are thoroughly intermixed and intermingled with the body they last and produce attractive flames until the fuel is entirely consumed.

I claim as my invention—

1. A brightly-inflammable fuel composed of pieces of hard porous, carbonized peat impregnated with metallic sulfate, substantially as specified.

2. A brightly-inflammable fuel composed of pieces of hard porous, carbonized peat impregnated with metallic sulfate and chlorid of sodium, substantially as specified.

FREDERICK C. ROCKWELL.

Witnesses:
ETHEL M. LOWE,
H. R. WILLIAMS.